US012560020B2

(12) United States Patent
Christian et al.

(10) Patent No.: US 12,560,020 B2
(45) Date of Patent: Feb. 24, 2026

(54) AUTOMATED TRANSACTION MACHINE

(71) Applicant: Diebold Nixdorf, Incorporated, North Canton, OH (US)

(72) Inventors: Todd Christian, Dalton, OH (US); Terry L. Schreffler, North Canton, OH (US); Doug Kovacs, North Canton, OH (US); Daniel P. Schoeffler, North Canton, OH (US); Steven Davis, North Canton, OH (US)

(73) Assignee: Diebold Nixdorf, Incorporated, North Canton, OH (US)

(*) Notice: Subject to any disclaimer, the term of this patent is extended or adjusted under 35 U.S.C. 154(b) by 454 days.

(21) Appl. No.: 17/621,482

(22) PCT Filed: Jun. 23, 2020

(86) PCT No.: PCT/US2020/039133
§ 371 (c)(1),
(2) Date: Dec. 21, 2021

(87) PCT Pub. No.: WO2020/263823
PCT Pub. Date: Dec. 30, 2020

(65) Prior Publication Data

US 2022/0349241 A1 Nov. 3, 2022

Related U.S. Application Data

(60) Provisional application No. 62/866,284, filed on Jun. 25, 2019.

(51) Int. Cl.
*E05G 1/024* (2006.01)
*E05G 1/06* (2006.01)
(Continued)

(52) U.S. Cl.
CPC ............... *E05G 1/024* (2013.01); *E05G 1/06* (2013.01); *G07D 11/125* (2019.01); *G07F 19/205* (2013.01)

(58) Field of Classification Search
CPC .. E05G 1/024; E05G 1/06; E05G 1/08; G07D 11/125; G07F 19/205; G07F 19/209; G07F 19/207; E05Y 2800/68; H05K 5/0004
See application file for complete search history.

(56) References Cited

U.S. PATENT DOCUMENTS 997,773 A * 7/1911 Fish ........................ E05G 1/024 109/72
1,547,721 A * 7/1925 Bellamore .............. E05G 1/024 109/65
(Continued)

FOREIGN PATENT DOCUMENTS

BR 200702143 A * 2/2008 ............. G07F 19/20
BR 1106873 A2 10/2013
(Continued)

OTHER PUBLICATIONS

WO2013094830A1, Espacenet machine translation description and claims, Jun. 27, 2013 (Year: 2024).*
(Continued)

*Primary Examiner* — Steven A Tullia
(74) *Attorney, Agent, or Firm* — Black McCuskey

(57) ABSTRACT

An automated transaction machine includes upper and lower units. The lower unit has a chest with a main body. The main body of the lower unit forms a cavity and has interior and exterior walls, made of metal, metal alloys or composite metallic material. There is a non-metallic material layer disposed therebetween. There is opening for passage of documents or other items between the upper and lower units. The upper unit has a housing with a main body. The main
(Continued)

body forms a cavity. The main body of the upper unit has an interior and an exterior wall. A transport system may be disposed in the housing to transport documents between the upper and lower units.

2 Claims, 12 Drawing Sheets

(51) Int. Cl.
*G07D 11/125* (2019.01)
*G07F 19/00* (2006.01)

(56) References Cited

U.S. PATENT DOCUMENTS

| | | | | | |
|---|---|---|---|---|---|
| 3,525,461 | A * | 8/1970 | Bronson | B60R 9/058 70/229 |
| 3,893,205 | A * | 7/1975 | Anderson | B23K 20/227 428/653 |
| 3,908,876 | A * | 9/1975 | Barhorst | B60R 9/048 224/331 |
| 4,048,926 | A * | 9/1977 | Brush, Jr. | E05G 1/024 109/83 |
| 4,272,137 | A | 6/1981 | Rothhaas | |
| 4,373,450 | A | 2/1983 | Miller | |
| 4,593,627 | A * | 6/1986 | Lankard | E05G 1/024 106/644 |
| 4,685,402 | A * | 8/1987 | Nelson | E05G 1/024 312/409 |
| 4,813,475 | A * | 3/1989 | Couvrette | G07F 9/105 165/223 |
| 4,893,397 | A * | 1/1990 | Hughes | E05G 1/024 312/409 |
| 6,158,833 | A * | 12/2000 | Engler | H05K 5/0209 312/409 |
| 6,527,172 | B1 | 3/2003 | Lewis | |
| 6,550,670 | B1 | 4/2003 | Lewis | |
| 6,736,473 | B2 * | 5/2004 | Cleveland | E05G 1/024 312/409 |
| 7,156,296 | B2 * | 1/2007 | Magee | G06Q 20/1085 902/8 |
| 7,661,584 | B1 * | 2/2010 | Lute | G07F 19/205 902/31 |
| 8,540,144 | B2 * | 9/2013 | Graef | G07F 19/20 235/379 |
| 8,552,079 | B2 * | 10/2013 | Clatty | C08G 18/4018 521/170 |
| 8,714,446 | B2 * | 5/2014 | Graef | G07F 19/20 235/379 |
| 9,482,042 | B2 * | 11/2016 | Boyes | E05G 1/024 |
| 9,683,401 | B2 * | 6/2017 | Smith | E05G 1/02 |
| 10,068,231 | B2 * | 9/2018 | Lewis | G07F 19/205 |
| 10,078,816 | B2 * | 9/2018 | Smolk | G07F 19/201 |
| 2002/0074393 | A1 * | 6/2002 | Anderson | G07F 19/201 235/379 |
| 2003/0094885 | A1 * | 5/2003 | Cleveland | E05G 1/024 312/409 |
| 2003/0193273 | A1 * | 10/2003 | Yamashita | G07F 19/20 312/100 |
| 2010/0170424 | A1 * | 7/2010 | Pinho | G07F 19/205 109/50 |
| 2012/0090452 | A1 * | 4/2012 | Sudhakar | F41H 5/0457 70/237 |
| 2012/0186086 | A1 | 7/2012 | Tavares De Pinho | |
| 2012/0222590 | A1 * | 9/2012 | Marques | G07F 19/205 109/78 |
| 2013/0075467 | A1 | 3/2013 | Graef et al. | |
| 2013/0233211 | A1 | 9/2013 | Tavares De Pinho | |
| 2014/0261110 | A1 * | 9/2014 | Romero | E05G 1/026 109/78 |
| 2015/0267458 | A1 | 9/2015 | Cardinal et al. | |
| 2017/0103620 | A1 * | 4/2017 | Vankirk | G07D 11/50 |
| 2022/0349241 | A1 * | 11/2022 | Christian | E05G 1/02 |

FOREIGN PATENT DOCUMENTS

| | | | | | |
|---|---|---|---|---|---|
| BR | 102012010863 | A2 * | 4/2015 | E05G 1/02 |
| CN | 113389463 | A * | 9/2021 | E05B 15/00 |
| DE | 2852982 | A * | 10/1979 | E05G 1/024 |
| DE | 102012201013 | B3 * | 2/2013 | E05B 53/001 |
| EP | 3244377 | A1 * | 11/2017 | G07F 19/205 |
| ES | 2317649 | T3 * | 4/2009 | G07F 19/20 |
| ES | 2711956 | T3 * | 5/2019 | E05G 1/00 |
| FR | 2491717 | A1 * | 10/1981 | H05K 5/0004 |
| GB | 2486199 | A * | 6/2012 | E05G 1/024 |
| IT | 1143858 | B * | 10/1986 | E05G 1/024 |
| JP | 4866021 | B2 * | 2/2012 | G07D 9/00 |
| KR | 20010031331 | A * | 4/2001 | C10B 25/10 |
| KR | 20130073403 | A * | 12/2011 | E05G 1/024 |
| KR | 20140027425 | A * | 12/2012 | E05B 19/0064 |
| PL | 194682 | B1 * | 6/2007 | G07F 19/205 |
| WO | WO-2004081739 | A2 * | 9/2004 | G06Q 20/1085 |
| WO | WO-2008017156 | A1 * | 2/2008 | A61L 27/42 |
| WO | WO-2013094830 | A1 * | 6/2013 | E05G 1/024 |
| WO | WO-2015200932 | A2 * | 12/2015 | E05G 1/12 |

OTHER PUBLICATIONS

WO2013094830 Espacenet machine translation claims and description (Year: 2024).*
International Search Report filed in PCT Application No. US2020/039133 dated Aug. 18, 2020; 2 pages.
Written Opinion filed in PCT Application No. US2020/039133 dated Aug. 18, 2020; 6 pages.
International Preliminary Report on Patentability filed in PCT Application No. US2020/039133 dated Dec. 28, 2021; 7 pages.
International Search Report filed in PCT Application No. US2020/039131 dated Aug. 6, 2020; 2 pages.
Written Opinion filed in PCT Application No. US2020I039131 dated Aug. 6, 2020; 7 pages
International Preliminary Report on Patentability filed in PCT Application No. US20201039131 dated Dec. 28, 2021.

* cited by examiner

AUTOMATED TRANSACTION MACHINE

CROSS-REFERENCE TO RELATED APPLICATIONS

This application is a National Phase filing of International Application Ser. No. PCT/US20/39133, for an AUTOMATED TRANSACTION MACHINE, filed 23 Jun. 2020, which claims priority to and the benefit of U.S. Provisional Patent Application No. 62/866,284, filed 25 Jun. 2019, the contents of which are hereby incorporated by reference in their entirety.

BACKGROUND

This relates in general to automated transaction machines (ATMs). ATMs typically include an upper unit and a lower unit. The lower unit is often a safe or secure portion for securing notes of value or other documents or items. The upper unit often includes various components necessary to interface with a use and conduct commercial transactions. Generally, there are three installation types of ATMs, a first freestanding inside a structure, a second disposed through the wall of a structure, and a third freestanding outside of any structure. The third installation typically includes features to address issues related to an outdoor environment, such as an exterior designed for weather or environmental concerns, climate control for the inside of the ATM, and/or additional security concerns for such an ATM. For example, these concerns may include, resistance to damage by fire, explosives, rain, and wind, as well as resistance to theft.

SUMMARY

This relates more specifically to a structure for an automated transaction machine. The automated transaction machine structure has a lower unit including a chest with a main body. The main body includes a cavity and both an interior and an exterior wall, wherein the interior and exterior walls are made of metal, metal alloys or composite metallic material. The interior and exterior walls are separated by a layer of non-metallic material, such as concrete, disposed therebetween. The lower unit further defines a first opening for the passage of documents. The automated transaction machine structure further includes an upper unit with a housing having a main body, wherein the main body forms a cavity. The main body has an interior and an exterior wall, a second opening, and a transport system disposed therein to transport documents between the upper and lower units through the opening of the lower unit. The upper unit may further include an air conditioning unit disposed therein.

DETAILED DESCRIPTION

Figure 1:
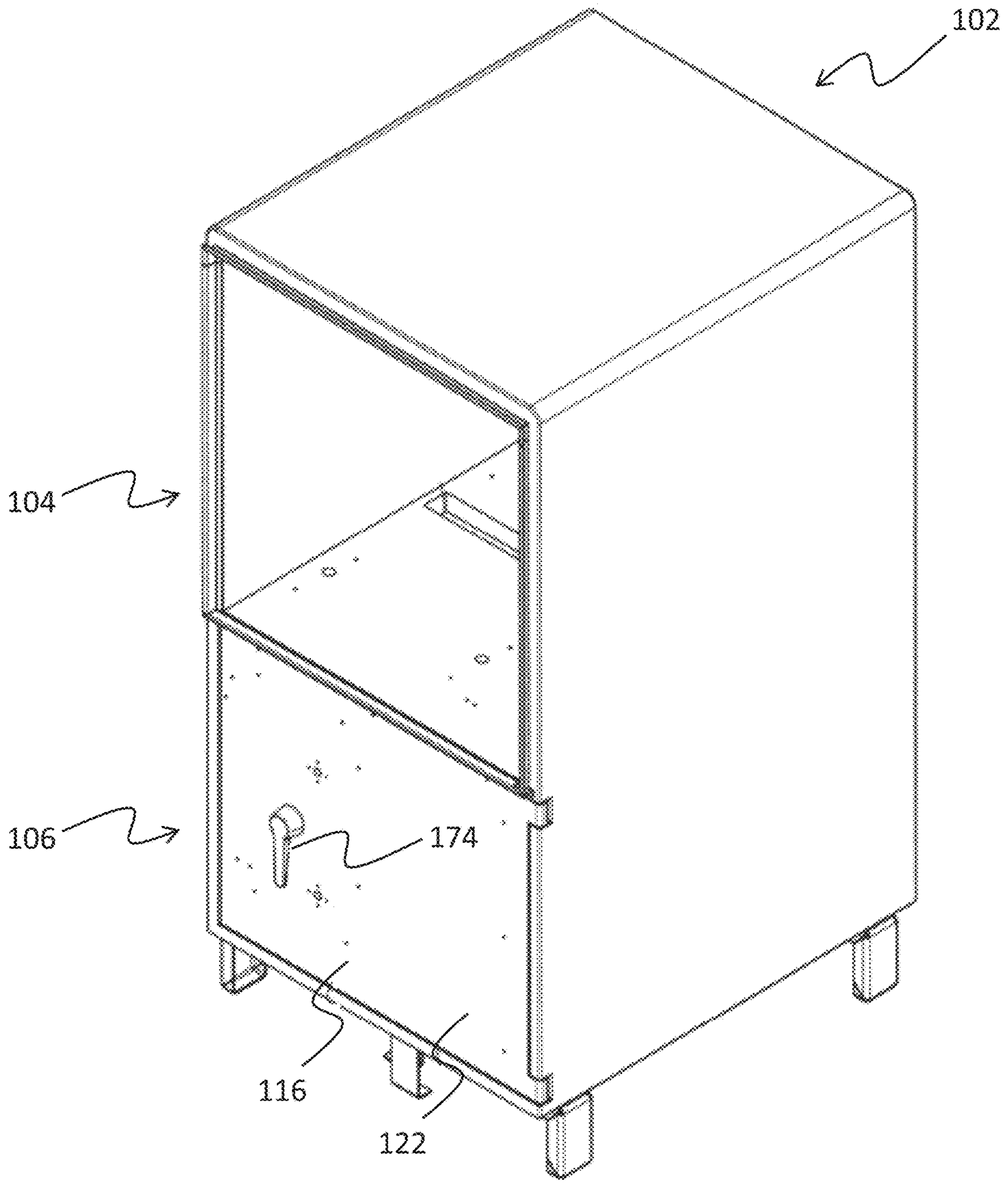
FIG. 1 is top right isometric view of an automated transaction machine structure including an upper unit and a lower unit.
Figure 2:
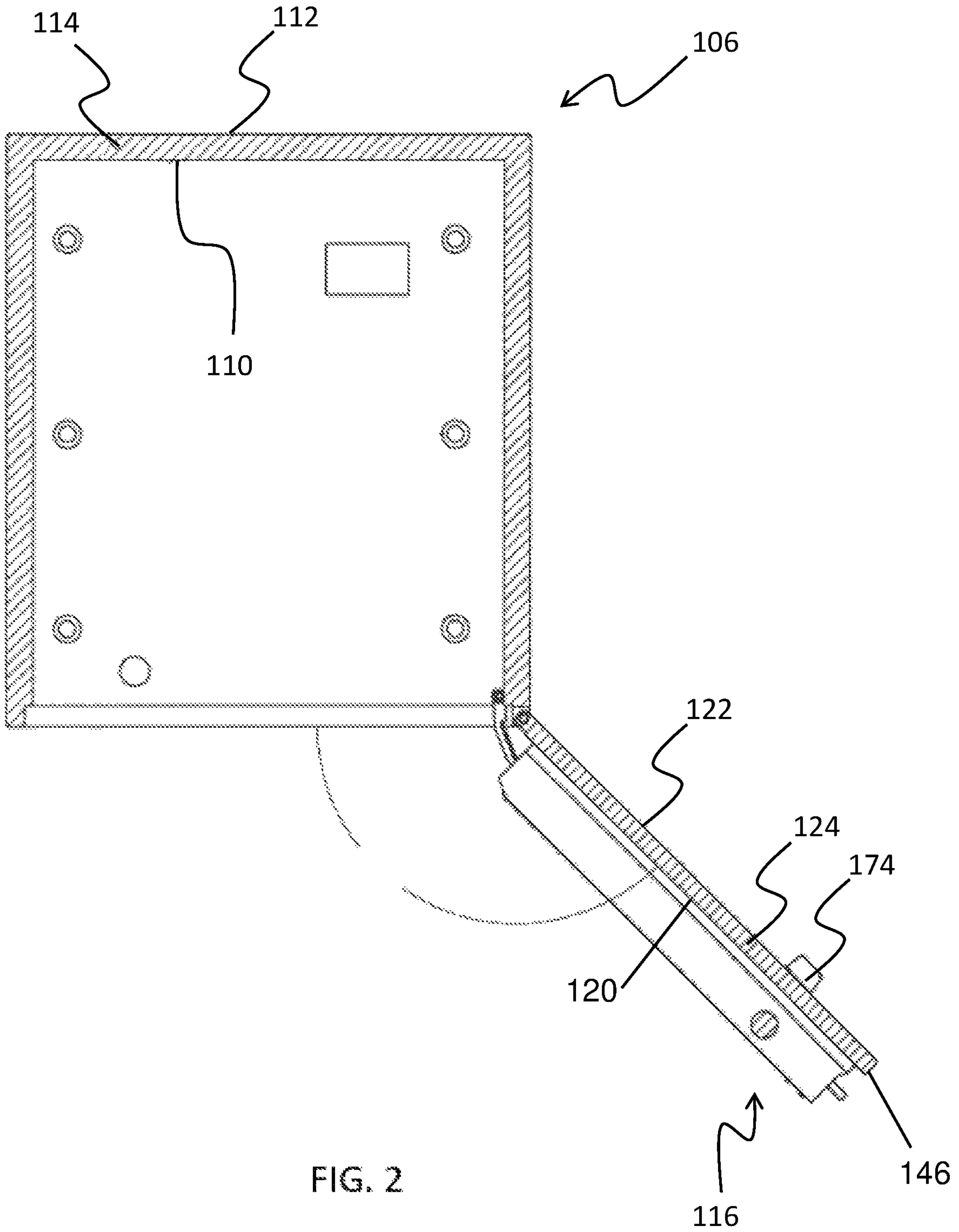
FIG. 2 is a cross sectional top view of a bottom portion of the lower unit of the automated transaction machine structure of FIG. 1.
Figure 3:
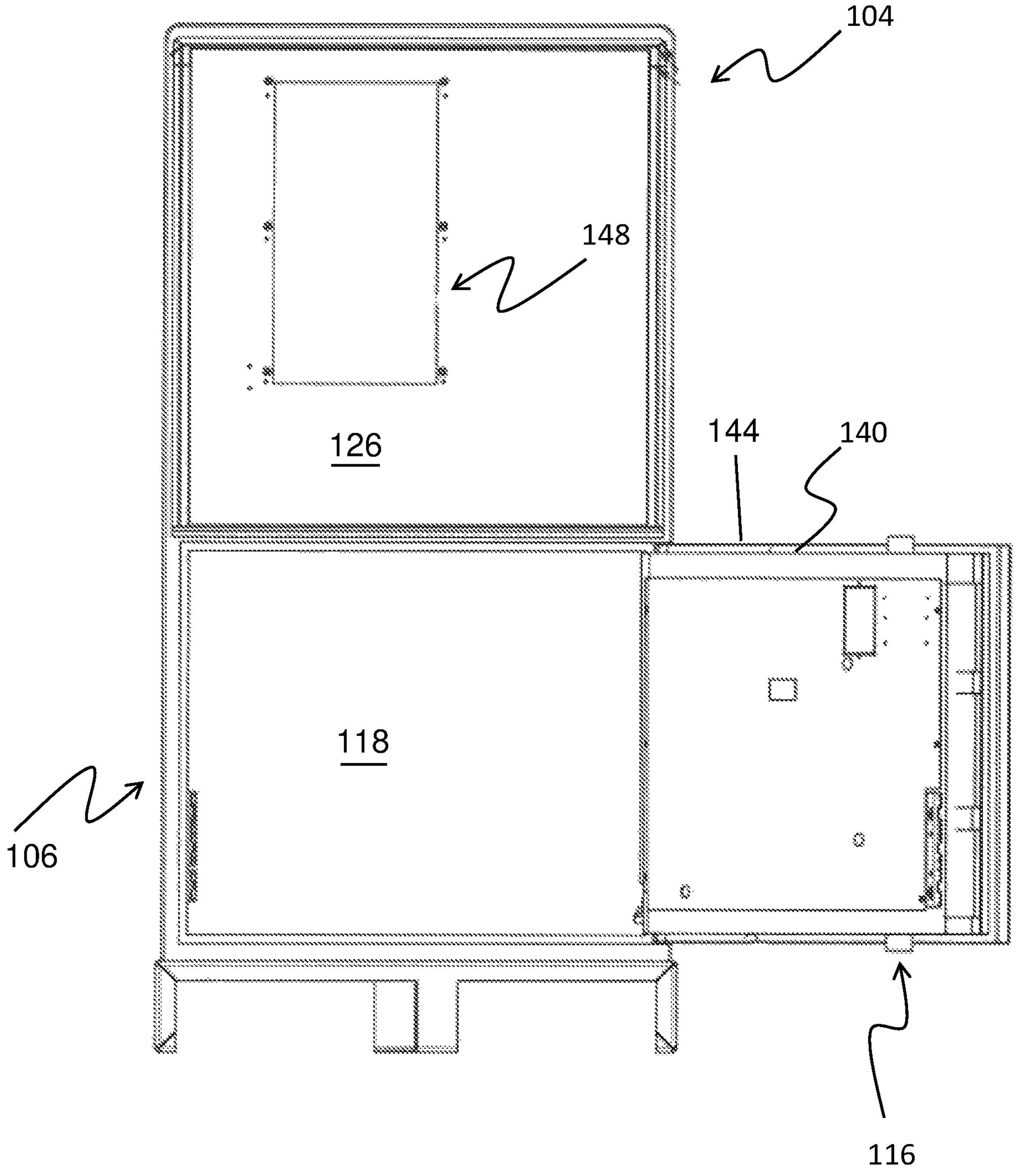
FIG. 3 is a front view of the automated transaction machine structure of FIG. 1.

Referring now to the drawings, there is illustrated in FIGS. 1-12 an embodiment of an automated transaction machine structure 102 including an upper unit 104 and a lower unit 106 with a central opening 108 for the passage of documents or other items between the upper unit 104 and the lower unit 106. The lower unit 106 includes a chest having a main body, the main body forming a chest cavity 118, and the main body having a lower unit interior wall 110 and a lower unit exterior wall 112. The lower unit interior wall 110 and lower unit exterior wall 112 are made of different metals, metal alloys, or composite metallic material, that, for example, may comply with both the UL and CEN standards for certain safes. In one exemplary embodiment, the metals are differing low carbon steels, for example of 3 mm in thickness. In another exemplary embodiment, the lower unit exterior wall 112 may be 303 stainless steel and the lower unit interior wall 110 may be low carbon steel, for example, each of 3 mm in thickness. The lower unit interior wall 110 and lower unit exterior wall 112 are separated by a layer of material 114 disposed therein, for example concrete, or other desired non-metallic material provided for security, thermal protection, and/or insulation. For further example, the material 114 may be a CEN IV rated aggregate.

The lower unit 106 may include the central opening 108 for passage of documents, such as but not limited to cash or checks, with the opening 108 being formed directly in the lower unit 106. Additionally, the lower unit 106 may include a door 116 for access to the chest cavity 118. The door 116 may be comprised of a door interior wall 120, a door exterior wall 122, and a material layer, such as concrete, 124 disposed between the door interior wall 120 and door exterior wall 122. The door 116 may include a handle 174. The door interior wall 120 and door exterior wall 122 may be comprised of two different metals. In one exemplary embodiment, the door exterior wall 122 is a stainless steel and the door interior wall 120 is a low carbon steel, each may be 3 mm in thickness.

The upper unit 104 includes a housing having a main body. The main body forms an upper unit cavity 126. The main body includes an upper unit interior wall 128 and an upper unit exterior wall 130. In one exemplary embodiment, there is disposed in the space between the upper unit interior wall 128 and the upper unit exterior wall 130 a material for insulation, security, and/or rigidity, for example an expandable foam, 132.

In at least one embodiment, the lower unit exterior wall 112 and the upper unit exterior wall 130 are formed as continuous structure. In one example, the continuous structure may be formed as a single body. In another example, it is formed as two bodies and then joined together.

A transport system (not shown) may be disposed in the automated transaction machine structure 102 to transport documents through the central opening 108 between the upper unit 104 and the lower unit 106. In at least one embodiment, a fascia (not shown) is mounted to the automated transaction machine structure 102 and may be fixed to the upper unit 104 and include a user interface to conduct transactions.

Figure 4:
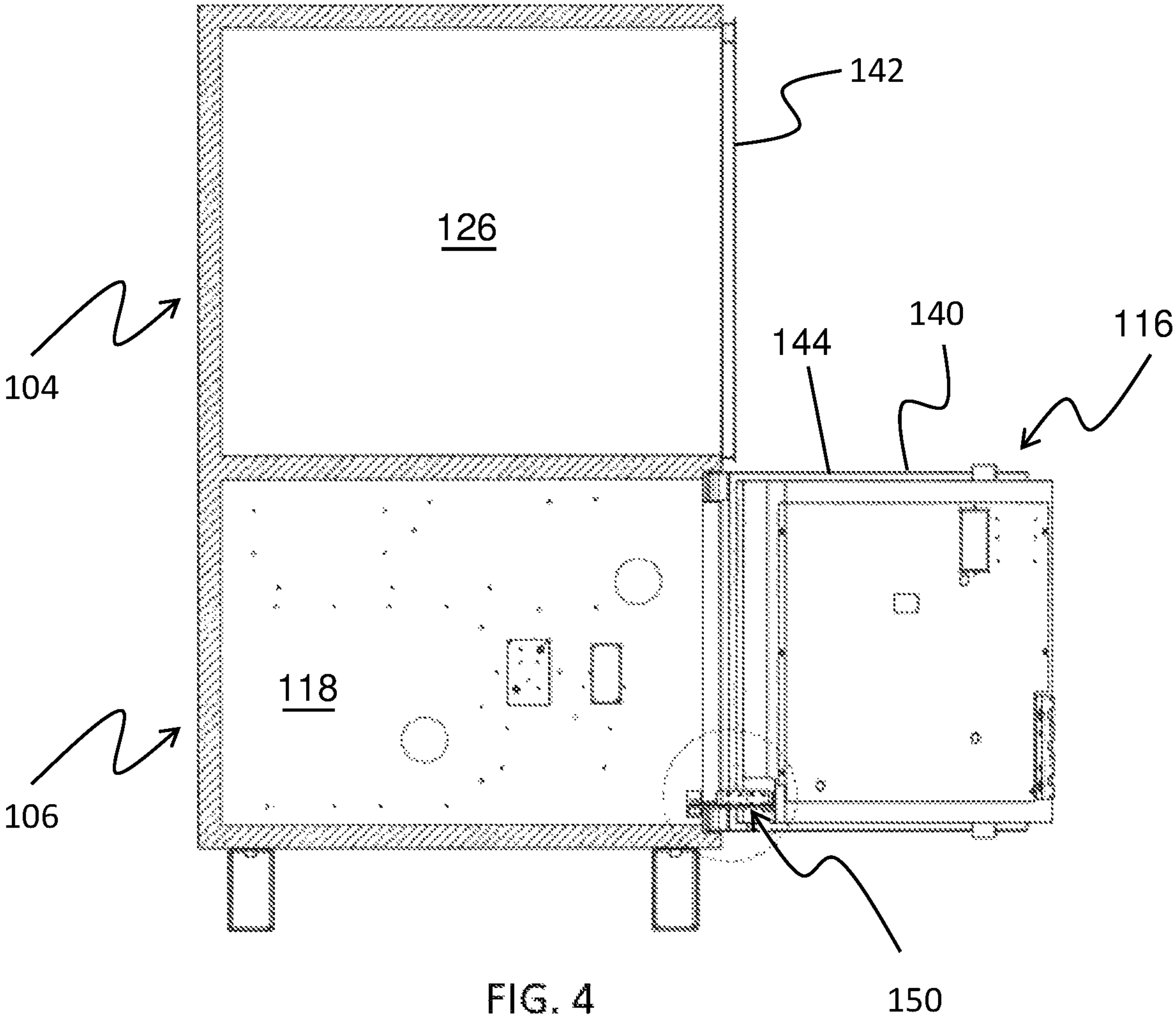
FIG. 4 is a cross sectional left side view of the automated transaction machine structure of FIG. 1.
Figure 4A:
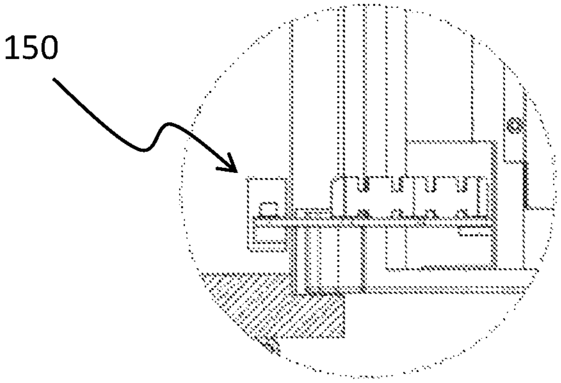
FIG. 4*a* is an enlarged view of a portion of FIG. 4.
Figure 5:
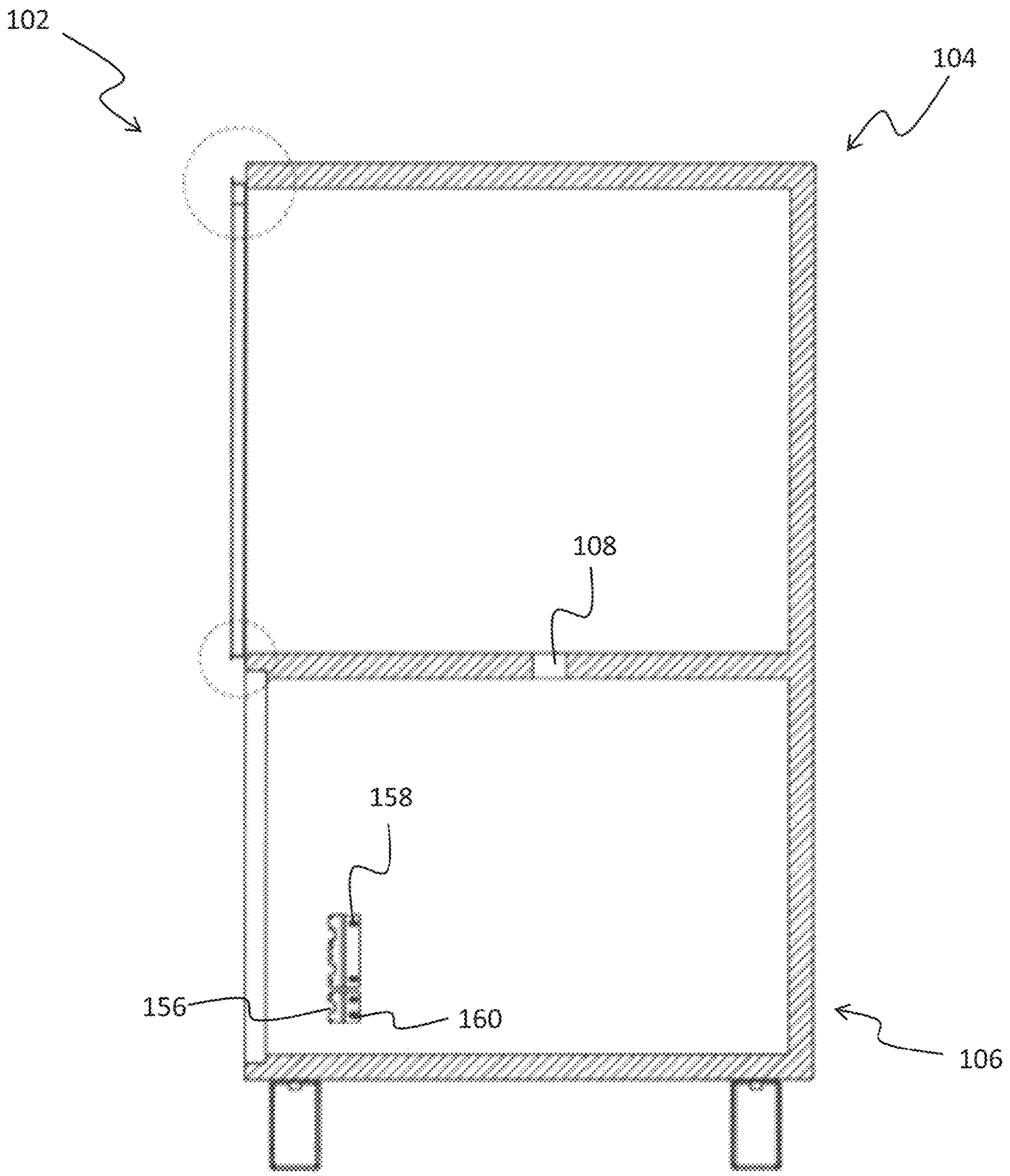
FIG. 5 is a cross sectional right side view of the automated transaction machine structure of FIG. 1.
Figure 5A:
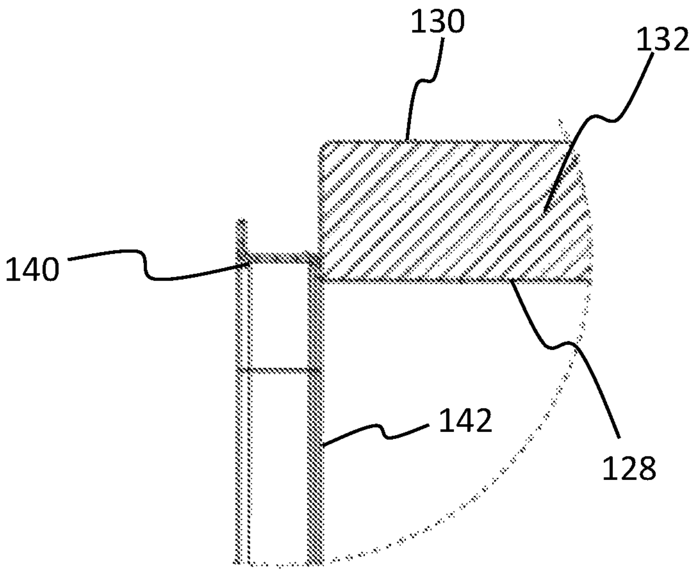
FIG. 5*a* is an enlarged view of a portion of FIG. 5.
Figure 5B:
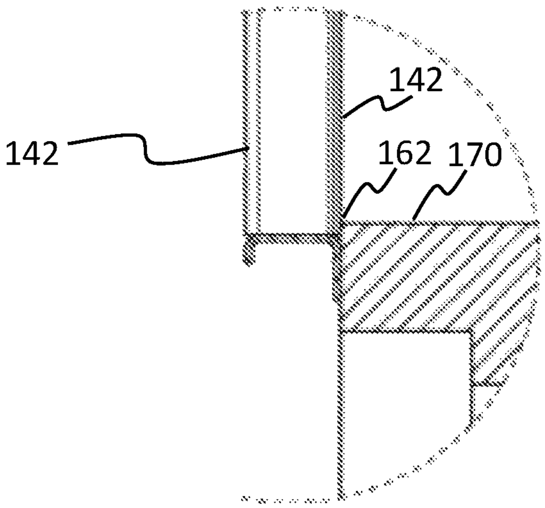
FIG. 5*b* is an enlarged view of another portion of FIG. 5.
Figure 6:
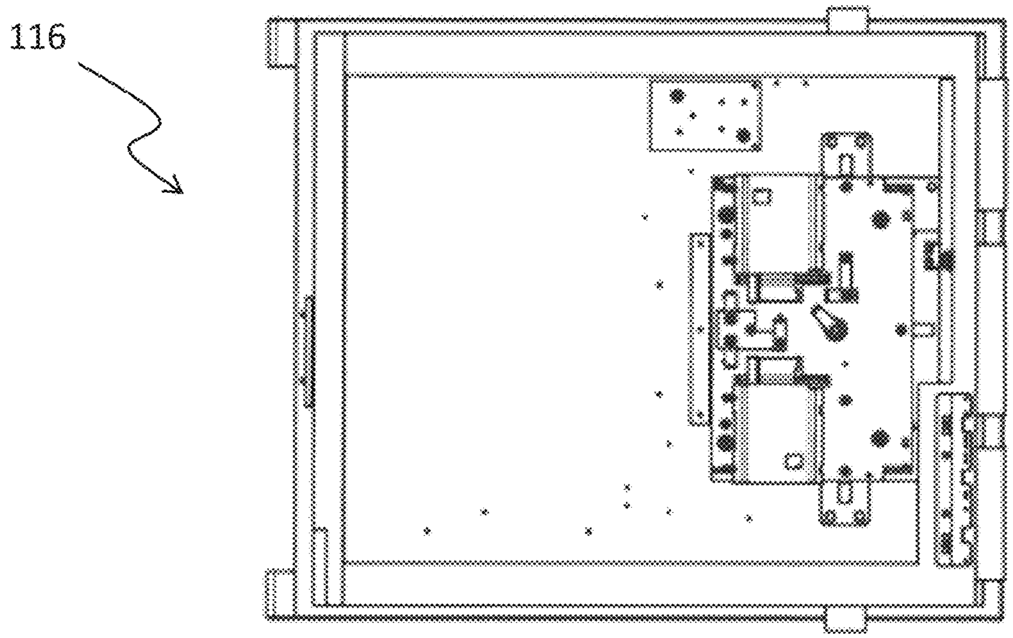
FIG. 6 is a rear view of the safe door of the automated transaction machine structure of FIG. 1 shown without the bolt cover.
Figure 7:
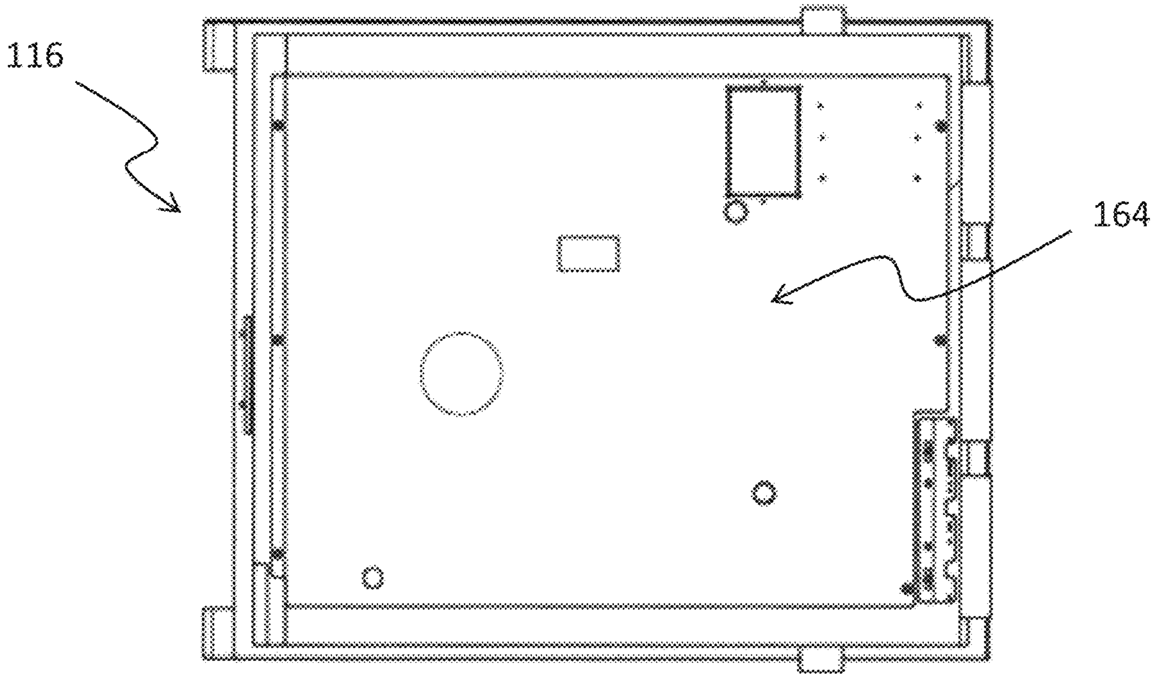
FIG. 7 is a view similar to FIG. 6, but showing the safe door including the bolt cover.
Figure 8:
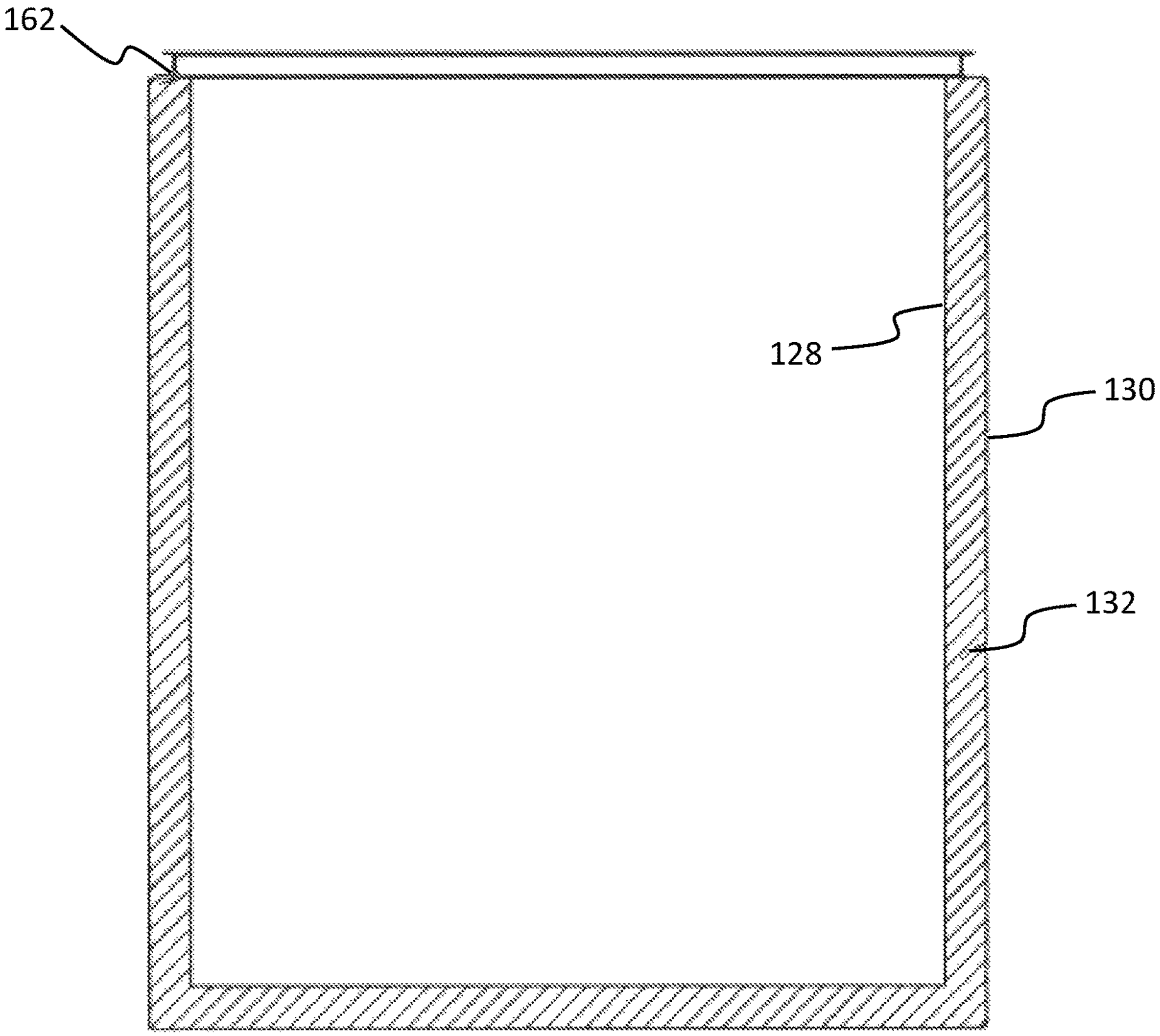
FIG. 8 is a cross sectional bottom view of the top wall of the upper unit of the automated transaction machine structure of FIG. 1.
Figure 9:
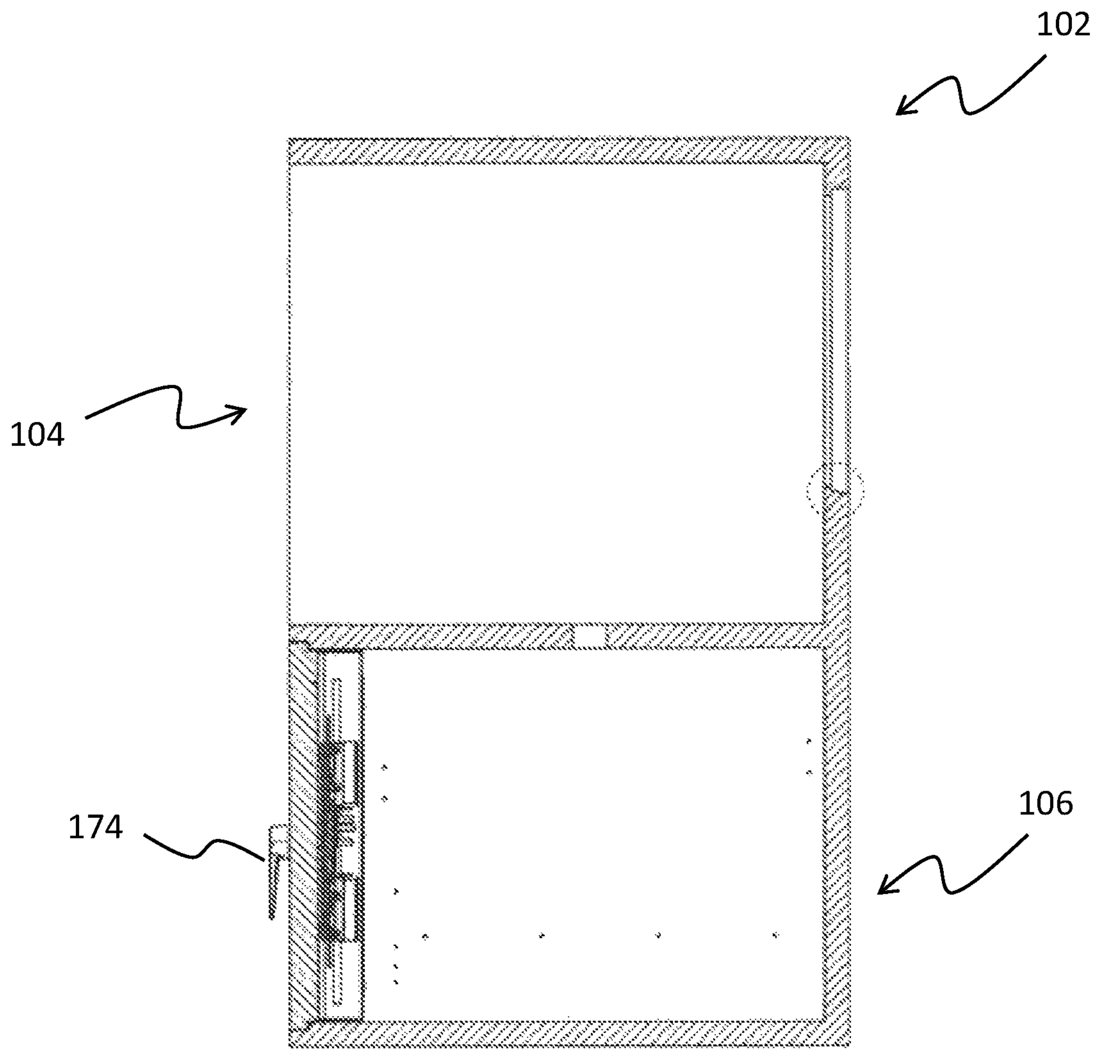
FIG. 9 is a partial cross sectional right side view of the automated transaction machine structure of FIG. 1.
Figure 9A:
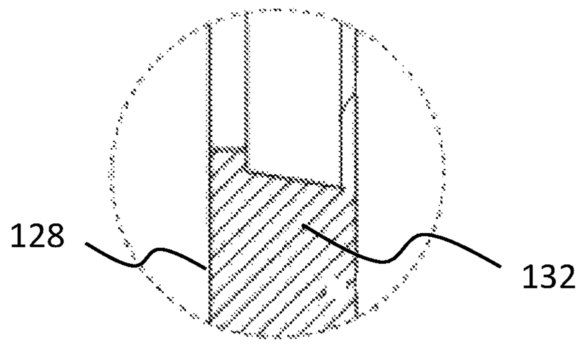
FIG. 9*a* is an enlarged view of a portion of FIG. 9.
Figure 10:
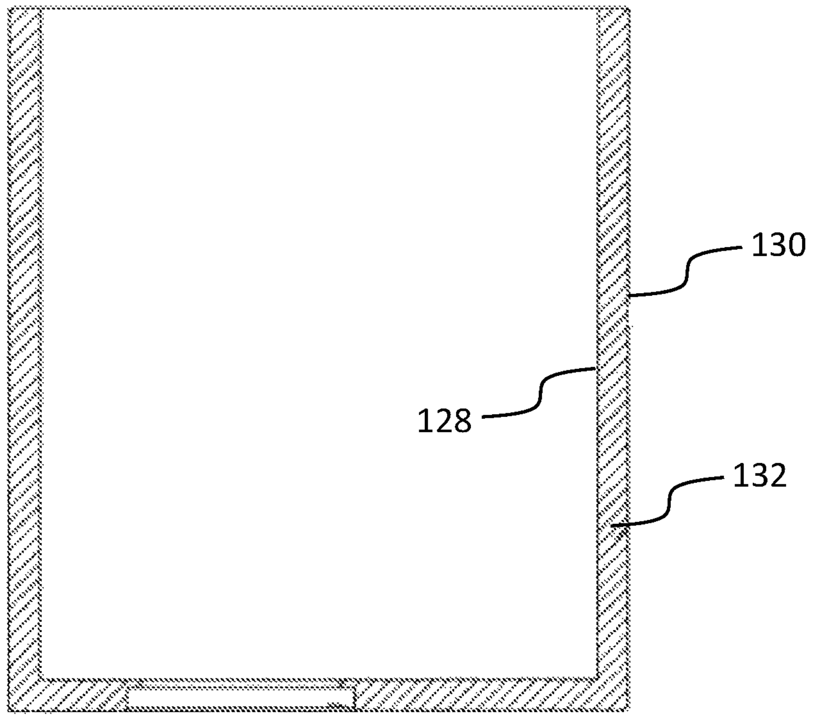
FIG. 10 is a cross sectional bottom view of the top wall of the upper unit of the automated transaction machine structure of FIG. 1.
Figure 10A:
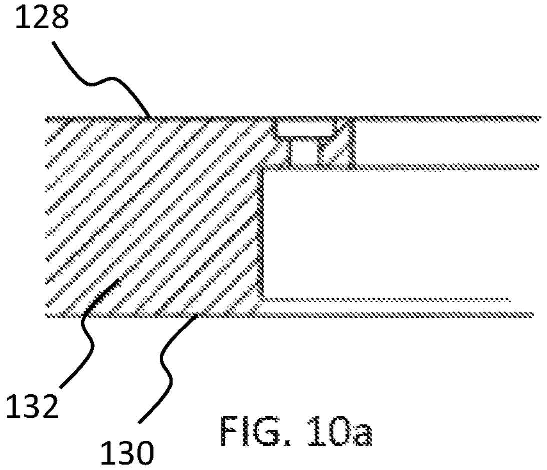
FIG. 10*a* is an enlarged view of a portion of FIG. 10.
Figure 11:
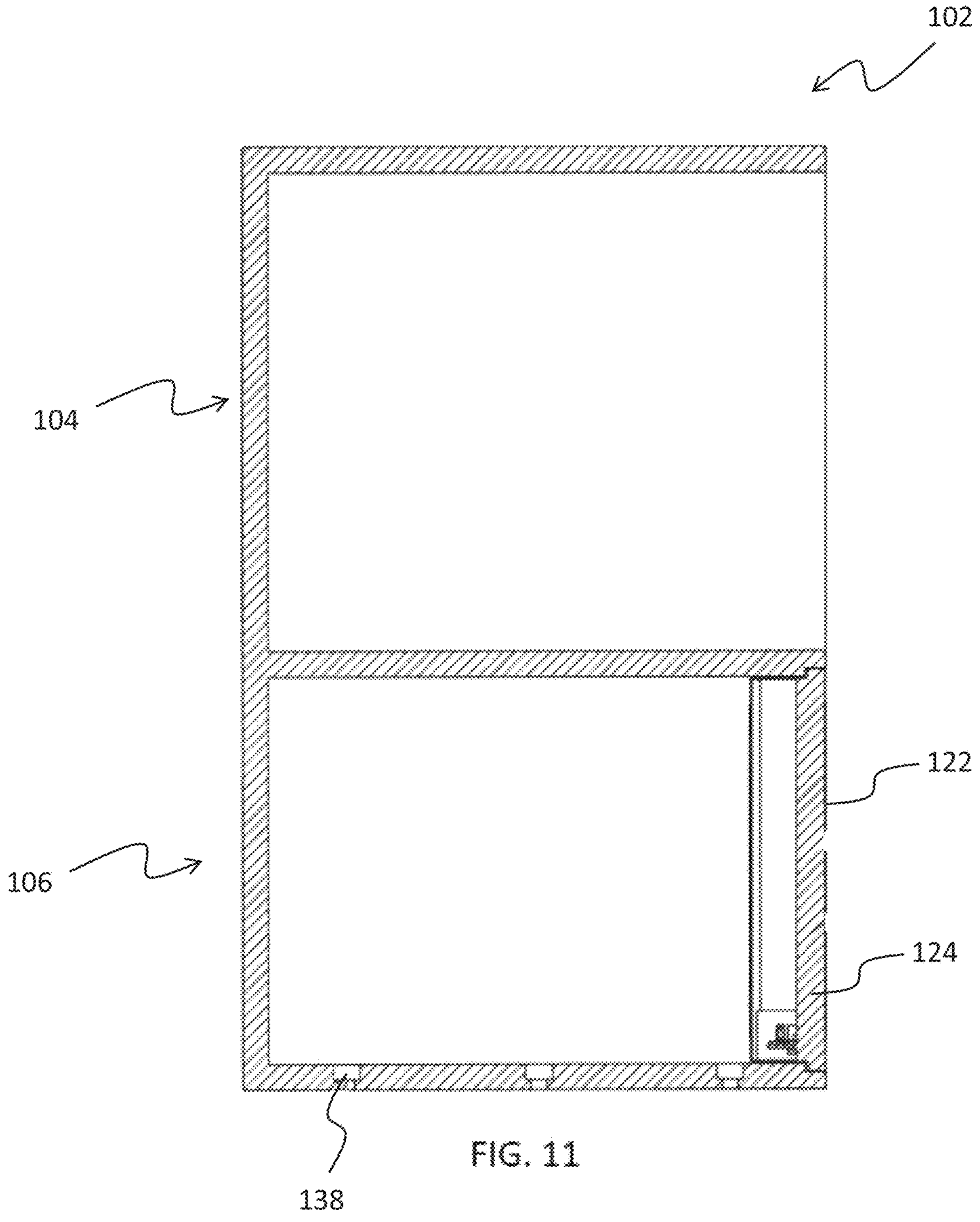
FIG. 11 is a partial cross sectional right side view of the automated transaction machine structure of FIG. 1.
Figure 12:
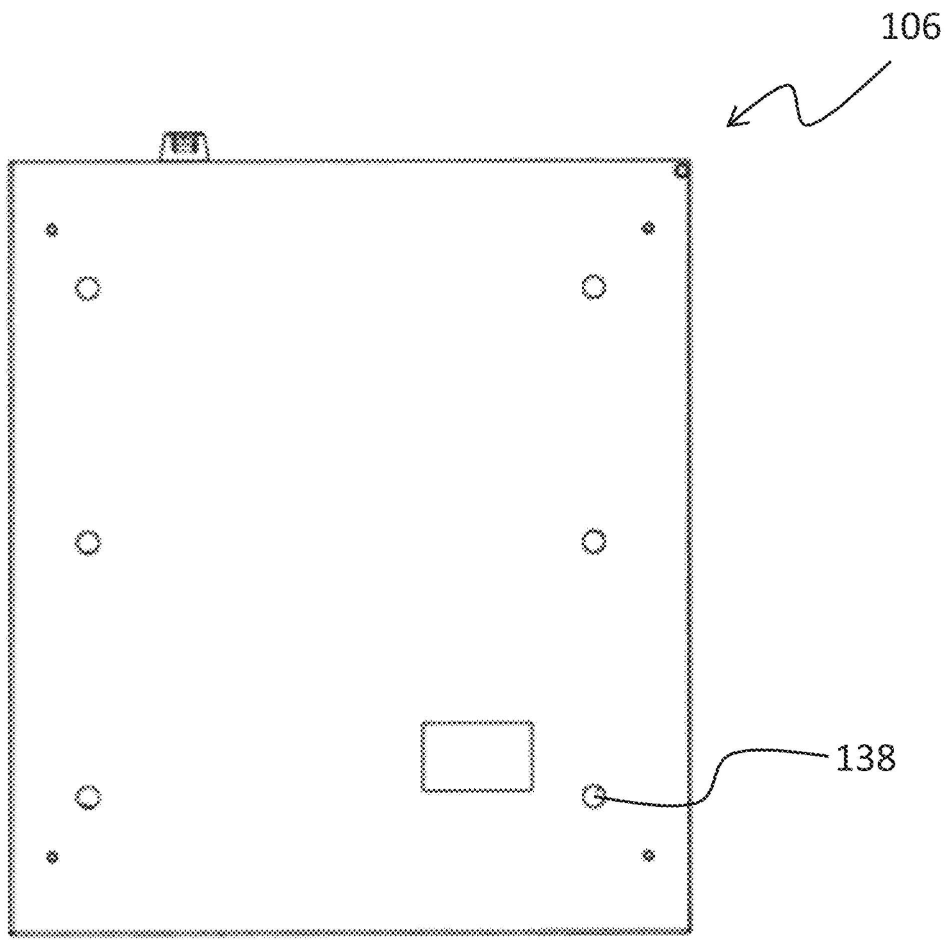
FIG. 12 is a bottom view of the lower unit of the automated transaction machine structure of FIG. 1.

In at least one embodiment the automated transaction machine structure 102 includes the door 116. In this embodiment the door 116 contains a horizontal gutter 140 along the top edge 144 as well as a vertical gutter 142 along the side edges 146 to keep moisture, or other material, out of the lower unit 106. As shown in FIGS. 1, 5, and 5*a*, a horizontal gutter 140 is positioned on the upper unit 104 along a top edge of an opening into the upper unit or "first" cavity 126. FIGS. 1 and 4 show the vertical gutter 142 extending along the side edge of the opening of the first cavity 126. FIG. 4 also shows the vertical gutter 142 is orthogonal to and spaced from the horizontal gutter 140. FIG. 5*a* shows an alternative arrangement in which both the horizontal gutter 140 and the vertical gutter 142 are positioned along the opening to the cavity 126 of the upper unit 104 wherein the vertical gutter 142 is orthogonal to and in contact with the horizontal gutter 140.

In at least one embodiment the automated transaction machine structure 102 includes six fixed points 138 to the ground. These points 138 are formed as apertures in the bottom of the lower unit 106 for the passage of anchors or fasteners which may be secured to the ground.

In at least one embodiment the automated transaction machine structure 102 includes an air conditioning unit 148 in the upper unit 104. The air conditioning unit 148 may be a cooling unit, a heating unit, a dehumidification unit, a humidification unit, or any other environmental control unit or any combination there of. In at least one embodiment the air conditioning unit 148 is capable of regulating the climate in both the upper unit 104 and the lower unit 106. It in expected in such an embodiment that the conditioned air will traverse between the upper unit 104 and lower unit 106 via the opening 108.

In at least one embodiment the automated transaction machine structure 102 includes and the door 116 on the lower unit 106. In this embodiment, the door 116 includes several horizonal gutters 140 and vertical gutters 142 along the top edge 144 and side edge 146.

In at least one embodiment the automated transaction machine structure 102 includes a door stop 150 located on the door 116 of the lower unit 106. The door stop 150 may include a fixing material and a cable retractor. The door stop 150, as shown in this embodiment, may include a holder magnet 156 and holder magnet switch 158 to engage the door 116 in a desired position. The door stop 150 may further be fixed to the door 116 with a screw 160. In one embodiment, the screw 160 may be a cylinder head screw.

In at least one embodiment a sealing material, such as silicone caulk, 162 is disposed at the junction of a top wall and side wall of the upper unit 104 of an automated transaction machine structure 102. In at least one embodiment, the silicone caulk 162 may be 3-4 mm thick. The silicone caulk 162 may be applied to reduce gaps between the safe door 116 and vertical gutters 142 and horizontal gutters 140. Additionally, the silicone caulk 162 may help create a water-tight seal between the door 116 and the gutters 140 and 142. Further, in this or other embodiments, a sealing material, such as silicone caulk, 162 may be disposed at the junction of a side wall 166 and bottom wall 170 of an automated transaction machine structure 102. In at least one embodiment the silicone caulk 162 may be 3-4 mm thick and is applied to reduce gaps and create a water-tight seal between the safe walls and the bottom wall 170 and gutters 140 and 142.

In at least one embodiment, the door 116 may include a bolt cover 164 to conceal various hardware, such as countersunk screws and base plates. The bolt cover 164 may be removable from the door 116.

What is claimed is:

1. An automated transaction machine structure, comprising:

an upper unit including a first main body forming a first cavity, the first cavity including an air conditioning unit disposed therein, the first main body having an upper unit interior wall and an upper unit exterior wall defining an upper space therebetween the upper unit interior wall and the upper unit exterior wall, the upper unit interior and upper unit exterior walls separated by a layer of a first non-metallic material that is an insulation disposed therein the upper space;

a lower unit including a second main body forming a second cavity, the second main body having a lower unit interior wall and a lower unit exterior wall defining a lower space therebetween the lower unit interior wall and the lower unit exterior wall, the lower unit interior and lower unit exterior walls separated by a layer of second non-metallic material that is a concrete disposed therein the lower space;

wherein the lower unit exterior wall and the upper unit exterior wall are formed as a continuous structure;

wherein the upper space and the lower space form a common space between the upper unit and the lower unit between the upper unit and lower unit interior walls of the upper and lower units and the upper unit and lower unit exterior walls of the upper and lower units;

wherein the upper and lower unit exterior walls are a stainless-steel;

wherein the upper and lower unit interior walls are a low carbon steel;

a central opening for the passage of items documents between the upper and lower units;

wherein the air conditioning unit is capable of regulating the climate in both of the upper unit first cavity and the lower unit second cavity such that air conditioned by the air conditioning unit will traverse between the upper unit and lower unit via the central opening;

wherein the lower unit includes a door to allow for selective access to the second cavity;

a horizontal gutter positioned on the upper unit along a top edge of the door;

a vertical gutter positioned on said upper unit along at least one side edge of an opening into the first cavity; and wherein the vertical gutter is orthogonal to and spaced from the horizontal gutter.

2. The automated transaction machine structure of claim 1 wherein the lower unit includes six fixed points to the ground including apertures formed in a bottom of the lower unit for the passage of anchors or fasteners that are secured to the ground.

* * * * *